United States Patent
Vaghefinazari et al.

(10) Patent No.: US 11,275,447 B2
(45) Date of Patent: *Mar. 15, 2022

(54) SYSTEM AND METHOD FOR GESTURE-BASED POINT OF INTEREST SEARCH

(71) Applicants: Honda Motor Co., Ltd., Tokyo (JP); EDGE 3 TECHNOLOGIES LLC, Phoenix, AZ (US)

(72) Inventors: Pedram Vaghefinazari, Long Beach, CA (US); Stuart Masakazu Yamamoto, Hacienda Heights, CA (US); Tarek A. El Dokor, Phoenix, AZ (US); Jordan Cluster, Tempe, AZ (US); James E. Holmes, Mesa, AZ (US)

(73) Assignees: HONDA MOTOR CO., LTD., Tokyo (JP); EDGE 3 TECHNOLOGIES LLC, Phoenix, AZ (US)

(*) Notice: Subject to any disclaimer, the term of this patent is extended or adjusted under 35 U.S.C. 154(b) by 484 days.

This patent is subject to a terminal disclaimer.

(21) Appl. No.: 16/058,704

(22) Filed: Aug. 8, 2018

(65) Prior Publication Data

US 2018/0348886 A1 Dec. 6, 2018

Related U.S. Application Data

(63) Continuation of application No. 15/367,526, filed on Dec. 2, 2016, now Pat. No. 10,073,535, which is a
(Continued)

(51) Int. Cl.
*G06F 3/01* (2006.01)
*G01C 21/00* (2006.01)
(Continued)

(52) U.S. Cl.
CPC ............ *G06F 3/017* (2013.01); *B60K 35/00* (2013.01); *B60K 37/06* (2013.01); *G01C 21/00* (2013.01);
(Continued)

(58) Field of Classification Search
None
See application file for complete search history.

(56) References Cited

U.S. PATENT DOCUMENTS

| 5,948,040 A | 9/1999 | Delorme et al. |
| 6,128,003 A | 10/2000 | Vernon et al. |

(Continued)

FOREIGN PATENT DOCUMENTS

WO    WO2012107066    8/2012

OTHER PUBLICATIONS

Office Action of U.S. Appl. No. 15/964,870 dated Oct. 16, 2019, 35 pages.
(Continued)

*Primary Examiner* — Navid Ziaeianmehdizadeh
(74) *Attorney, Agent, or Firm* — Rankin, Hill & Clark LLP

(57) ABSTRACT

A user, such as the driver of a vehicle, to retrieve information related to a point of interest (POI) near the vehicle by pointing at the POI or performing some other gesture to identify the POI. Gesture recognition is performed on the gesture to generate a target region that includes the POI that the user identified. After generating the target region, information about the POI can be retrieved by querying a server-based POI service with the target region or by searching in a micromap that is stored locally. The retrieved POI information can then be provided to the user via a display and/or speaker in the vehicle. This process beneficially allows a user to rapidly identify and retrieve information
(Continued)

about a POI near the vehicle without having to navigate a user interface by manipulating a touchscreen or physical buttons.

20 Claims, 7 Drawing Sheets

Related U.S. Application Data continuation of application No. 14/333,369, filed on Jul. 16, 2014, now Pat. No. 9,541,418, which is a continuation of application No. 13/835,252, filed on Mar. 15, 2013, now Pat. No. 8,818,716.

(51) Int. Cl.
| | |
|---|---|
| G01C 21/36 | (2006.01) |
| G06K 9/00 | (2006.01) |
| B60K 35/00 | (2006.01) |
| B60K 37/06 | (2006.01) |
| G06F 3/0346 | (2013.01) |
| G06F 3/16 | (2006.01) |

(52) U.S. Cl.
CPC ..... *G01C 21/3664* (2013.01); *G01C 21/3679* (2013.01); *G01C 21/3682* (2013.01); *G06F 3/0346* (2013.01); *G06F 3/167* (2013.01); *G06K 9/00389* (2013.01); *G06K 9/00671* (2013.01); *B60K 2370/146* (2019.05); *B60K 2370/148* (2019.05); *B60K 2370/1464* (2019.05); *B60K 2370/152* (2019.05); *B60K 2370/166* (2019.05); *B60K 2370/589* (2019.05); *B60K 2370/592* (2019.05); *B60K 2370/595* (2019.05)

(56) References Cited

U.S. PATENT DOCUMENTS

| | | | |
|---|---|---|---|
| 7,035,731 B2* | 4/2006 | Smith | G01C 21/26 |
| | | | 340/995.24 |
| 7,050,606 B2 | 5/2006 | Paul et al. | |
| 7,289,645 B2 | 10/2007 | Yamamoto et al. | |
| 7,295,904 B2 | 11/2007 | Kanevsky et al. | |
| 7,561,961 B2 | 7/2009 | Wakamatsu et al. | |
| 9,315,196 B2 | 4/2016 | Heisterkamp | |
| 9,377,860 B1 | 6/2016 | Weber et al. | |
| 9,487,167 B2 | 11/2016 | Graumann et al. | |
| 9,518,831 B2* | 12/2016 | Tuukkanen | G01C 21/20 |
| 2004/0204821 A1* | 10/2004 | Tu | G01C 21/3679 |
| | | | 701/527 |
| 2005/0134117 A1 | 6/2005 | Ito et al. | |
| 2005/0264527 A1 | 12/2005 | Lin | |
| 2006/0200309 A1* | 9/2006 | Yu | G01C 21/32 |
| | | | 701/532 |
| 2007/0038950 A1* | 2/2007 | Taniguchi | H04W 4/021 |
| | | | 715/768 |
| 2007/0150444 A1 | 6/2007 | Chesnais et al. | |
| 2007/0177806 A1 | 8/2007 | Vartiainen | |
| 2007/0219706 A1* | 9/2007 | Sheynblat | G01C 21/3679 |
| | | | 701/532 |
| 2008/0065291 A1 | 3/2008 | Breed | |
| 2008/0085048 A1 | 4/2008 | Venetsky et al. | |
| 2008/0133133 A1 | 6/2008 | Abels | |
| 2008/0273715 A1 | 11/2008 | Snider et al. | |
| 2009/0103780 A1 | 4/2009 | Nishihara et al. | |
| 2009/0278915 A1 | 11/2009 | Kramer et al. | |
| 2009/0287361 A1 | 11/2009 | Iwashima et al. | |
| 2010/0050133 A1 | 2/2010 | Nishihara et al. | |
| 2010/0185341 A1 | 7/2010 | Wilson et al. | |
| 2010/0231509 A1 | 9/2010 | Boillot et al. | |
| 2010/0253542 A1 | 10/2010 | Seder et al. | |
| 2010/0274480 A1 | 10/2010 | McCall et al. | |
| 2011/0050589 A1 | 3/2011 | Yan et al. | |
| 2011/0221666 A1 | 9/2011 | Newton et al. | |
| 2011/0260965 A1 | 10/2011 | Kim et al. | |
| 2011/0286676 A1 | 11/2011 | El Dokor | |
| 2011/0291926 A1 | 12/2011 | Gokturk et al. | |
| 2012/0062558 A1 | 3/2012 | Lee et al. | |
| 2012/0068956 A1 | 3/2012 | Jira et al. | |
| 2012/0264457 A1 | 10/2012 | Khosravy et al. | |
| 2013/0030811 A1* | 1/2013 | Olleon | G06F 3/013 |
| | | | 704/267 |
| 2013/0063336 A1 | 3/2013 | Sugimoto et al. | |
| 2013/0155237 A1 | 6/2013 | Paek et al. | |
| 2013/0261871 A1 | 10/2013 | Hobbs et al. | |
| 2014/0236481 A1* | 8/2014 | Lee | G01C 21/3484 |
| | | | 701/527 |

OTHER PUBLICATIONS

Office Action of U.S. Appl. No. 15/964,870 dated Jan. 29, 2020, 39 pages.
Graham-Rowe, D., "Give Your Dashboard the Finger," Feb. 2, 2011, MIT Technology Review, fourth pages. [Online] [Retrieved Aug. 1, 2014] Retrieved from the Internet <URL:http//www.technologyreview.com/422584/five-your-dashboard-the-finger/.
Guo, D., et al., "Vision-Based Hand Gesture Recognition for Human-Vehicle Interaction," Proceedings of the International Conference on Control, Automation and Computer Vision, 1998, pp. 151-155, vol. 1.
Howley, D., "Mercedes Benz's DICE Augmented Reality System: Minority Report for Your Car," Laptopmag.com, Jan. 12, 2012, 3 pages [online] [retrieved on May 25, 2012] Retrived from the internet URL:http://blog.laptopmag.com/mercedes-benzs-dice-augmented-reality-system-minority-report-for-your-car.
Mashita, T., et al., "A Wearable Camera System for Pointing Gesture Recognition and Detecting Indicated Objects," Proceedings of the 2003 Conference on Computer Vision and Pattern Recognition Workshop (CVPRW '03), 2003, six pages.
Yoon, H.-S., et al., "Hand gesture recognition using combined features of location, angle and velocity," Pattern Recognition, 2001, pp. 1491-1507, vol. 34.
PCT International Search Report and Written Opinion, PCT Application No. PCT/US2014/024852, dated Sep. 24, 2014, eleven pages.
D.J. Holding. "Microprocessors", Chapter 15 of "Electrical Engineer's Reference Book", Sixteenth Edition, M.A. Laughton and D.J. Warne (Eds.), copyright 2003 by Elsevier Science, published by Newnes Press, ISBN 0-7506-46373.
"IEEE 100: The Authoritative Dictionary of IEEE Standards Terms", Seventh Edition, copyright 2000 by the Institute of Electrical and Electronics Engineers, Inc., published Dec. 2000 by IEEE Standards Information Network Press, ISBN 0-7381-2601-2.
Office Action of U.S. Appl. No. 15/964,870 dated Jun. 9, 2020, 69 pages.
Office Action of U.S. Appl. No. 15/964,870 dated Jun. 17, 2019, 41 pages.
Office Action of U.S. Appl. No. 15/964,870 dated Oct. 14, 2020, 76 pages.
Office Action of U.S. Appl. No. 15/964,870 dated Feb. 25, 2021, 60 pages.
Office Action of U.S. Appl. No. 15/964,870 dated Jul. 21, 2021, 59 pages.
Office Action of U.S. Appl. No. 15/964,870 dated Dec. 27, 2021, 68 pages.

* cited by examiner

SYSTEM AND METHOD FOR GESTURE-BASED POINT OF INTEREST SEARCH

CROSS-REFERENCE TO RELATED APPLICATION

This application is a continuation of U.S. application Ser. No. 15/367,526, filed Dec. 2, 2016, which itself is a continuation of U.S. application Ser. No. 14/333,369, filed Jul. 16, 2014, which itself is a continuation of U.S. application Ser. No. 13/835,252, filed Mar. 15, 2013 and issued as U.S. Pat. No. 8,818,716, both of which are incorporated by reference in their entireties. This application is also related to U.S. application Ser. No. 13/228,395, entitled "Vehicle User Interface System," which is incorporated by reference herein in its entirety.

BACKGROUND

1. Field of the Invention

The present invention relates generally to gesture recognition and in particular to searching for a point of interest based on a gesture.

2. Description of the Related Arts

Vehicle technologies and features available to and controlled by a driver have advanced in recent years. For example, many vehicles feature integrated computing systems with network connections that can be used to retrieve and display a wide range of information. One key function of vehicle-based computing systems is the ability to retrieve information related to points of interest (POI) near the vehicle. This can be useful, for example, when the driver wishes to identify a nearby building or view information (e.g., ratings and reviews) for a restaurant or store.

A driver typically interacts with a vehicle-based computing system by inputting commands via a touchscreen or physical buttons on the center console of the vehicle. However, using a touchscreen or buttons to request POI information by navigating a map or typing in a search term can be cumbersome and frustrating, especially when the driver is requesting information about a POI that he can see through the vehicle's windows.

SUMMARY

A computing system retrieves information associated with a point of interest based on an identifying gesture that a user performs inside a vehicle. The identifying gesture is oriented so that it identifies an object outside the vehicle. The computing system receives a data signal representing the identifying gesture and performs gesture recognition on the data signal to determine a direction vector corresponding to the direction of the identifying gesture. The system also accesses location data to identify the vehicle's current location and orientation. The direction vector, location, and orientation are then analyzed to generate a target region that corresponds to the object that was identified by the gesture, and the system retrieves information associated with one or more POIs in the target region. The retrieved information is provided to the user via an output device, such as a speaker or display.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

Embodiments are now described with reference to the accompanying figures. Like reference numbers indicate identical or functionally similar elements. Also in the figures, the left most digit of each reference number corresponds to the figure in which the reference number is first used.

Overview

A POI information retrieval module allows a user, such as the driver of a vehicle, to retrieve information related to a point of interest near the vehicle by pointing at the POI or performing some other gesture to identify the POI. A camera system in the vehicle captures the gesture and sends a data signal representing the gesture to the POI information retrieval module. The POI information retrieval module performs gesture recognition on the data signal to generate a target region that includes the POI that the user identified. After generating the target region, information about the POI can be retrieved by querying a server-based POI service with the target region or by searching in a micromap that is stored locally. The retrieved POI information can then be provided to the user via a display and/or speaker in the vehicle. This process beneficially allows a user to rapidly identify and retrieve information about a POI near the vehicle without having to navigate a user interface by manipulating a touchscreen or physical buttons.

The user may optionally issue a voice command along with a gesture. If a microphone in the vehicle detects a voice command, the POI information retrieval module performs voice recognition on the voice command to generate a character string representing the words that were spoken as part of the command. The character string can then be used to help identify the POI that the user pointed at. For example, if the user says "building" while pointing at a building, the POI information retrieval module can ignore information for non-building objects (e.g., playgrounds, parking lots, etc.) when retrieving information for POIs in the target region.

Operating Environment

Figure 1:
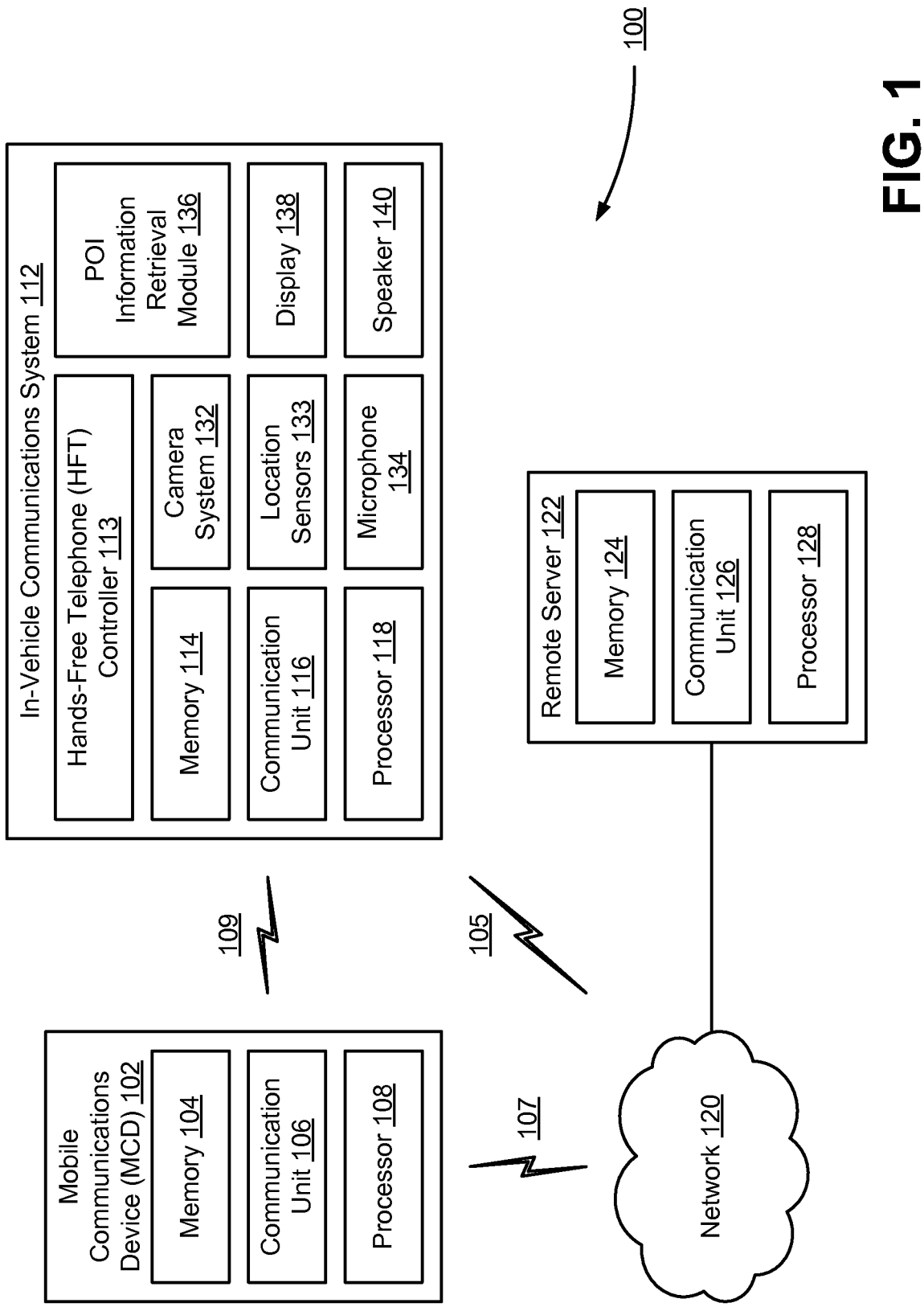
FIG. 1 illustrates an exemplary operating environment 100 for various embodiments of the gesture-based POI search system.

FIG. 1 illustrates an exemplary operating environment 100 for various embodiments. The operating environment 100 may include an in-vehicle communications system 112. One example of such a system is an in-vehicle hands free telephone (HFT) controller 113 which will be used as an example herein for ease of discussion. The operating environment 100 may also include a wireless mobile communication device (MCD) 102, a communication link 105 for communications between the in-vehicle system 112 and a network 120, a short-range communication link 109 for communication between the in-vehicle system 112 and the wireless mobile communication device 102, a wireless networking communication link 107 between the wireless mobile communication device 102 and the network 120, and a POI data server 122 connected to the network 120. The communication links described herein can directly or indirectly connect these devices. The network 120 can be a wireless communication network such as a cellular network comprised of multiple base stations, controllers, and a core network that typically includes multiple switching entities and gateways, for example.

The functions described herein are set forth as being performed by a device in the operating environment 100 (e.g., the in-vehicle communication system 112, the MCD 102, and/or the remote server 122). In embodiments, these functions can be performed in any of these devices or in any combination of these devices and/or other devices.

The operating environment 100 includes input devices, such as a camera system 132, location sensors 133, and a microphone 134. The camera system 132, location sensors 133, and/or microphone 134 can be part of the in-vehicle system 112 (as shown in FIG. 1) or can be in the MCD 102 (not shown), for example. In one embodiment, the camera system 132 includes a sensor that captures physical signals from within the vehicle (e.g., a time of flight camera, an infrared sensor, a traditional camera, etc). The camera system 132 is positioned to capture physical signals from a user such as hand or arm gestures from a driver or passenger. The camera system 132 can include multiple cameras positioned to capture physical signals from various positions in the vehicle, e.g., driver seat, front passenger seat, second row seats, etc. Alternatively, the camera system 132 may be a single camera which is focused on one position (e.g., the driver), has a wide field of view, and can receive signals from more than one occupant of the vehicle, or can change its field of view to receive signals from different occupant positions.

In another embodiment, the camera system 132 is part of the MCD 102 (e.g., a camera incorporated into a smart phone), and the MCD 102 can be positioned so that the camera system 132 captures gestures performed by the occupant. For example, the camera system 132 can be mounted so that it faces the driver and can capture gestures by the driver. The camera system 132 may be positioned in the cabin or pointing toward the cabin and can be mounted on the ceiling, headrest, dashboard or other locations in/on the in-vehicle system 112 or MCD 102.

After capturing a physical signal, the camera system 132 outputs a data signal representing the physical signal. The format of the data signal may vary based on the type sensor(s) that were used to capture the physical signals. For example, if a traditional camera sensor was used to capture a visual representation of the physical signal, then the data signal may be an image or a sequence of images (e.g., a video). In embodiments where a different type of sensor is used, the data signal may be a more abstract or higher-level representation of the physical signal.

The location sensors 133 are physical sensors and communication devices that output data associated with the current location and orientation of the vehicle. For example, the location sensors 133 may include a device that receives signals from a global navigation satellite system (GNSS) or an electronic compass (e.g., a teslameter) that measures the orientation of the vehicle relative to the four cardinal directions. The location sensors 133 may also operate in conjunction with the communication unit 116 to receive location data associated with connected nodes in a cellular tower or wireless network. In another embodiment, some or all of the location sensors 133 may be incorporated into the MCD 102 instead of the vehicle.

The microphone 134 captures audio signals from inside the vehicle. In one embodiment, the microphone 134 can be positioned so that it is more sensitive to sound emanating from a particular position (e.g., the position of the driver) than other positions (e.g., other occupants). The microphone 134 can be a standard microphone that is incorporated into the vehicle, or it can be a microphone incorporated into the MCD 102. The microphone 134 can be mounted so that it captures voice signals from the driver. For example, the microphone 138 may be positioned in the cabin or pointing toward the cabin and can be mounted on the ceiling, headrest, dashboard or other locations in/on the vehicle or MCD 102.

The POI information retrieval module 136 retrieves information related to one or more POIs based on input from the camera system 132 and (optionally) the microphone 134. After performing the search, the module 136 sends the result to the display 138 and/or speaker 140 so that the result can be provided to the user. A detailed description of the components and operation of the POI information retrieval module 136 is presented below with reference to FIGS. 2-5.

The operating environment 100 also includes output devices, such as a display 138 and a speaker 140. The display 138 receives and displays a video signal. The display 138 may be incorporated into the vehicle (e.g., an LCD screen in the central console, a HUD on the windshield), or it may be part of the MCD 102 (e.g., a touchscreen on a smartphone). The speaker 140 receives and plays back an audio signal. Similar to the display 138, the speaker 140 may be incorporated into the vehicle, or it can be a speaker incorporated into the MCD 102.

The in-vehicle hands-free telephone (HFT) controller 113 and wireless mobile communication device (MCD) 102 may communicate with each other via a short-range communication link 109 which uses short-range communication technology, such as, for example, Bluetooth® technology or other short-range communication technology, for example, Universal Serial Bus (USB). The HFT controller 113 and mobile communications device 102 may connect, or pair, with each other via short-range communication link 109. In an embodiment the vehicle 113 can include a communications unit 116 that interacts with the HFT controller 113 to engage in the short range communications, a memory unit device 114, and a processor 118. The HFT controller 113 can be part of a vehicle's telematics system which includes memory/storage, processor(s) and communication unit(s). The HFT controller 113 can utilize the vehicle's telematics unit to assist in performing various functions. For example, the communications unit 116 and/or processor 118 can be part of the vehicle's telematics unit or can be a separate unit in the vehicle.

The processors 108, 118 and/or 128 process data signals and may comprise various computing architectures including a complex instruction set computer (CISC) architecture, a reduced instruction set computer (RISC) architecture, or an architecture implementing a combination of instruction sets. Although only a single processor is shown in each device in FIG. 1, multiple processors may be included in each device. The processors can comprise an arithmetic logic unit, a microprocessor, a general purpose computer, or some other information appliance equipped to transmit, receive and process electronic data signals from the memory 104, 114, 124, and other devices both shown and not shown in the figures.

Examples of a wireless mobile communication device (MCD) 102 include a cellular phone, personal device assistant (PDA), smart phone, pocket personal computer (PC), laptop computer, tablet computer, smart watch or other devices having a processor, communications capability and are easily transportable, for example. The MCD 102 includes a communications unit 106, a memory unit device 104, and a processor 108. The MCD 102 also includes an operating system and can include various applications either integrated into the operating system or stored in memory/storage 104 and executed by the processor 108. In a common form, an MCD application can be part of a larger suite of vehicle features and interactions. Examples of applications include applications available for the iPhone™ that is commercially available from Apple Computer, Cupertino, Calif., applications for phones running the Android™ operating system that is commercially available from Google, Inc., Mountain View, Calif., applications for BlackBerry devices, available from Research In Motion Ltd., Waterloo, Ontario, Canada, and/or applications available for Windows Mobile devices, available from Microsoft Corp., Redmond, Wash.

In alternate embodiments, the mobile communication device 102 can be used in conjunction with a communication device embedded in the vehicle, such as a vehicle-embedded phone, a wireless network card, or other device (e.g., a Wi-Fi capable device). For ease of discussion, the description herein describes the operation of the embodiments with respect to an embodiment using a mobile communication device 102. However, this is not intended to limit the scope of the embodiments and it is envisioned that other embodiments operate using other communication systems between the in-vehicle system 112 and the network 120, examples of which are described herein.

The mobile communication device 102 and the in-vehicle system 112 may exchange information via short-range communication link 109. The mobile communication device 102 may store information received from the in-vehicle system 112, and/or may provide the information (such as voice and/or gesture signals) to a remote processing device, such as, for example, the remote server 122, via the network 120. The remote server 122 can include a communications unit 126 to connect to the network 120, for example, a memory/storage unit 124 and a processor 128.

In some embodiments, the in-vehicle system 112 may provide information to the mobile communication device 102. The mobile communication device 102 may use that information to obtain additional information from the network 120 and/or the server 122. The additional information may also be obtained in response to providing information with respect to a prompt on wireless mobile communication device 102 from in-vehicle system 112.

The network 120 may include a wireless communication network, for example, a cellular telephony network, as well as one or more other networks, such as, the Internet, a public-switched telephone network (PSTN), a packet-switching network, a frame-relay network, a fiber-optic network, and/or other types of networks.

Performing Gesture-Based Point of Interest Searches

Figure 2:
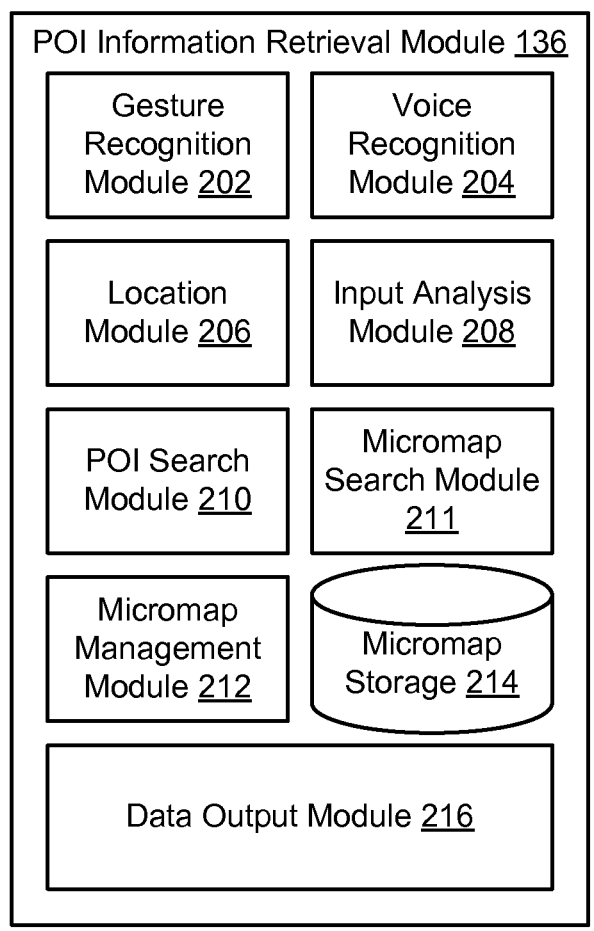
FIG. 2 is a high-level block diagram illustrating components of the POI information retrieval module of FIG. 1, according to one embodiment.

FIG. 2 is a high-level block diagram illustrating components of the POI information retrieval module 136 of FIG. 1, according to one embodiment. The POI information retrieval module 136 includes a gesture recognition module 202, a location module 204, a voice recognition module 206, and input analysis module 208, a POI search module 210, a micromap management module 212, micromap storage 214, and an information output module 216. In alternative embodiments, the POI information retrieval module 136 may include additional, fewer, or different components, and the functionality of the components 202 through 216 described herein may be distributed among components of the information retrieval module 136 in a different manner.

The gesture recognition module 202 receives a data signal from the camera system 132 and performs a gesture recognition algorithm on the received data signal to identify and interpret the gesture that was captured by the camera system 132. As described above with reference to the camera system 132, the data signal is an electronic representation of a gesture that the user performed in the vehicle. For example, the data signal may be an image of the gesture, a sequence of images, or some other representation of the gesture. In one embodiment, the gesture recognition module 202 is configured to automatically detect an identifying gesture that identifies an object exterior to the vehicle. When an identifying gesture is detected, the gesture recognition module 202 analyzes the gesture to determine a direction vector representing the direction of the gesture.

The voice recognition module 204 receives an output signal from the microphone 134 and performs a voice recognition algorithm on the received signal to identify voice commands received by the microphone 134. The voice recognition module 204 generates a computer-readable output representing words in the voice command. For example, the voice recognition module 204 may output the words as a character string.

The location module 206 receives data from the location sensors 133 and uses the data to determine the current location and orientation of the vehicle. If the location module 206 receives multiple types of data for determining the vehicle's current location (e.g., a combination of GNSS data and location data for connected cell towers), then the module 206 may perform averaging or some other aggregation technique to combine the data into a single location (e.g., a single set of lat/long coordinates). The location module 206 may similarly perform aggregation to combine multiple types of orientation data.

The input analysis module 208 receives input data from the gesture recognition module 202, the voice recognition module 204, and the location module 206 and analyzes the input data to determine a target region corresponding to an identifying gesture that was captured by the camera system 132. After determining the target region, the input analysis module 208 queries the POI search module 210 and/or the micromap search module 211 to retrieve information related to points of interest inside the target region. The operation of the input analysis module 208 is described below in greater detail.

The POI search module 210 receives a target region from the input analysis module 208 and performs a point of interest search in the target region by querying a remote server. In addition to the target region, the POI search module 210 may also receive character strings representing voice commands issued by the user. In this case, the POI search module 210 may include the character strings in the query in order to obtain more accurate results. To perform the search, the POI search module 210 may access a database on the server 122. Alternatively, the module 210 may access a service operating on a third-party server (e.g., Yelp™, Google Local).

The micromap search module 211 receives a target region from the input analysis module 208 and searches a corresponding micromap in the micromap storage 214 for information related to POIs in the target region. As used herein, a micromap is a map of a region that contains one or more POIs. Each micromap also includes information related to the POIs in the micromapped region. Since micromaps are stored locally in the micromap storage 214 in some embodiments, POI information that is stored in a micromap can be accessed with less latency than POI information that is retrieved from a remote server (e.g., by the POI search module 210). This can be particularly beneficial in regions with a high density of POIs, such as a downtown region in a major city.

The micromap management module 212 retrieves micromaps of regions that the vehicle is likely to enter and stores the retrieved micromaps in the micromap storage. In one embodiment, the micromap management module 212 monitors the location, orientation, and speed of the vehicle to automatically identify micromaps for retrieval. An example process for automatically identifying micromaps in this manner is described in detail with reference to FIG. 5.

The data output module 216 receives information related to one or more POIs from one of the search modules 210, 211 and sends the information to the display 138, the speaker 140, or some other output device in the MCD 102 or the in-vehicle communications system 112. In one embodiment, the data output module 216 sends an audio representation of a portion of the information for a point of interest while showing additional information to the user via the display 138. For example, if the data output module 216 receives information related to a restaurant, the module 216 may have the speaker 140 speak out the name of the restaurant while reviews of the restaurant are sent to the display 138.

In other embodiments, some or all of the components 202 through 216 of the POI information retrieval module 136 are positioned external to the in-vehicle system 112. In one embodiment, the components 202 through 216 are implemented as an application downloaded to the MCD 102 (e.g., applications available from iTunes). In another embodiment, the components 202 through 216 are implemented on the remote server 122, and data from the camera system 132, location sensors 133, and microphone 134 are sent over the network 120 to the remote server 122 to be analyzed.

Figure 3:
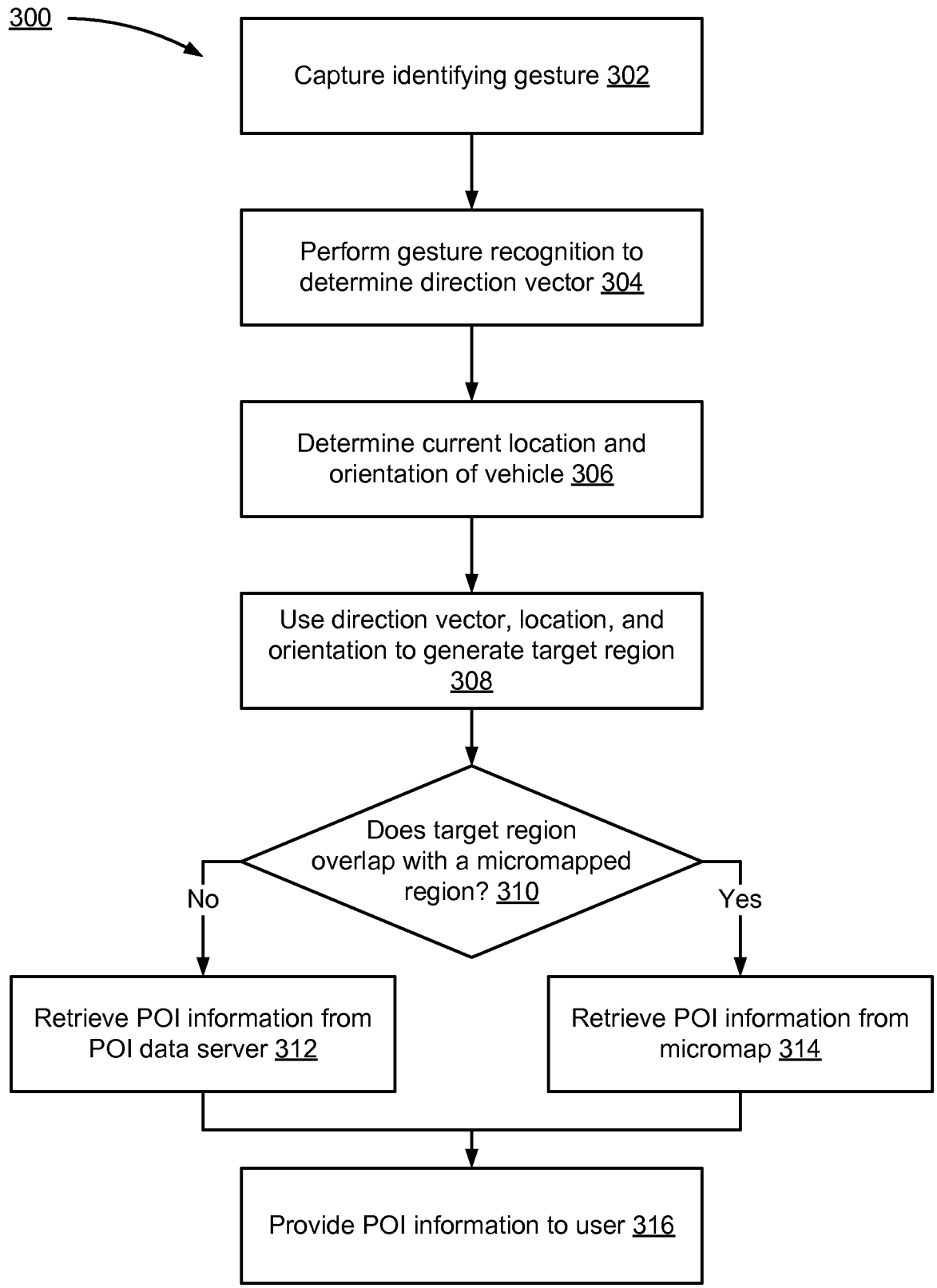
FIG. 3 is a flow chart illustrating a process for retrieving information about a POI based on an identifying gesture, according to one embodiment.
Figure 4A:
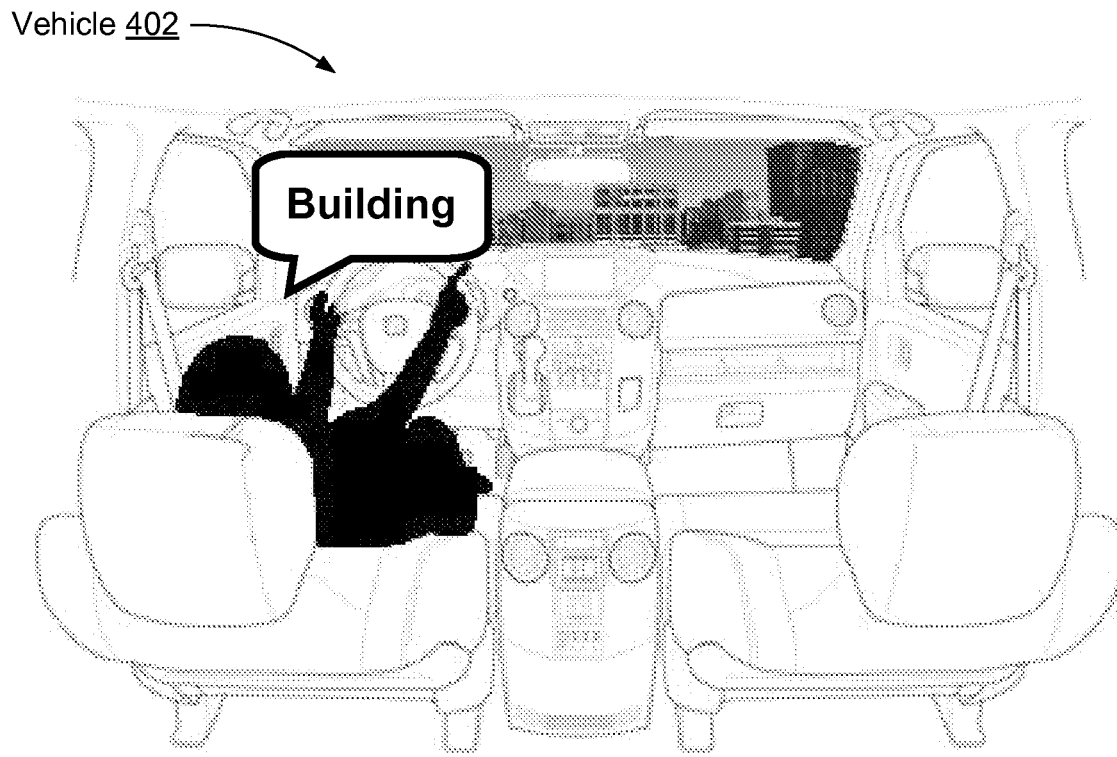
FIG. 4A-4D illustrate an example of a gesture-based POI search.

FIG. 3 is a flow chart illustrating a process for retrieving information about a POI based on an identifying gesture, according to one embodiment. For ease of discussion, the process 300 shown in FIG. 3 will be described below in conjunction with the example shown in FIGS. 4A-4D. The process 300 begins when a user performs an identifying gesture inside a vehicle. The identifying gesture is directed toward the exterior to the vehicle to identify an object outside the vehicle and request information about the object. For example, the user shown in FIG. 4A is performing an identifying gesture to request information for a building near the vehicle 402 by pointing at the building with an outstretched arm and forefinger. As the user performs the identifying gesture, the camera system 132 captures 302 the identifying gesture and sends a data signal representing the gesture to the gesture recognition module 202.

Figure 4B:
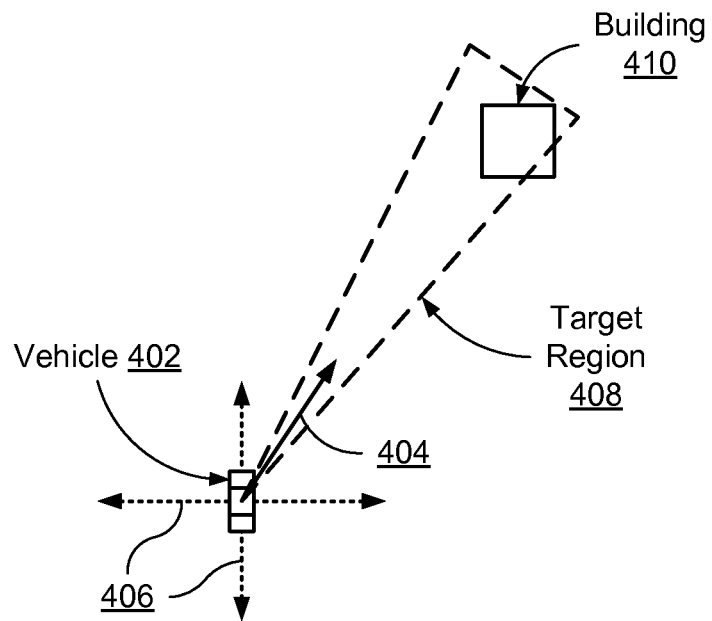

After receiving the data signal from the camera system 132, the gesture recognition module 202 performs 304 gesture recognition on the data signal to determine a direction vector corresponding to the identifying gesture. In one embodiment, the gesture recognition module 202 uses depth information in the data signal to generate a 3D depth reconstruction of the identifying gesture. The 3D depth reconstruction is then used to determine the direction vector 404. An example direction vector 404 is illustrated in FIG. 4B. In the illustrated example, the direction vector 404 is a two-dimensional vector that represents the direction of the identifying gesture relative to a pair of axes 406 that are parallel and perpendicular to the vehicle's direction of travel.

In addition to the outstretched arm and forefinger gesture shown in the example of FIG. 4A, the gesture recognition module 202 may also be configured to recognize other types of identifying gestures and determine a direction vector upon detecting one of these other gestures. For example, the gesture recognition module 202 may also be configured to determine a direction vector for an identifying gesture comprising an outstretched arm without a specific arrangement of fingers, or an identifying gesture comprising a hand on the steering wheel with an outstretched finger pointing at an exterior object.

The user may optionally issue a voice command to provide additional information about the object being identified. In the example illustrated in FIG. 4A, the user says "building" while performing the identifying gesture to indicate that he is pointing at a building. A voice command may be particularly helpful in situations where the object being identified (e.g., a building) is adjacent to a different type of object (e.g., a park). Although the user shown in FIG. 4A issues the voice command at the same time as he performs identifying gesture, the user may alternatively issue a voice command before or after performing the identifying gesture.

If the microphone 134 captures a voice command with the identifying gesture, then the voice recognition module 204 analyzes the voice command to generate a computer-readable representation of the command. In the example of FIG. 4A, the voice recognition module 204 generates the character string "building" after receiving the corresponding audio signal from the microphone 134.

Meanwhile, the location module 206 receives data from the location sensors 133 to determine 306 the current location and orientation of the vehicle. In one embodiment, the location module 206 polls the location sensors 133 to determine a current location and orientation only after detecting that the user has performed an identifying gesture. In another embodiment, the location module 206 polls the location sensors 133 at regular intervals to maintain a constantly updated location and orientation for the vehicle.

Next, the input analysis module 208 receives the direction vector and the current location and orientation of the vehicle and generates 308 a target region that is likely to contain the object that the user identified. In one embodiment, the target region is generated to align with the direction vector. In the example shown in FIG. 4B, the target region 408 has an elongated triangular shape that follows the direction of the direction vector 404 and has one corner anchored at the location of vehicle 402. The triangular shape shown in the example of FIG. 4B is a particularly convenient shape because it can be defined as a geo-fence with three pairs of lat/long coordinates (i.e., defining the vertices of the triangle). Alternatively, the target region may be some other shape that corresponds to the direction vector. In one embodiment, the input analysis module 208 also uses the current speed of the vehicle when determining the target region. For example, the target region can extend farther from the vehicle when the vehicle is traveling at a faster speed.

After generating 308 the target region, the input analysis module 208 accesses the micromap storage 214 to determine 310 whether the target region overlaps with any micromaps that have been stored in the micromap storage 214. If the target region does not overlap with any micromapped regions, then the input analysis module 208 sends the target region to the POI search module 210, and the POI search module 210 performs a search to retrieve 312 information for the POI that was identified with the identifying gesture. As described above with reference to FIG. 2, the POI search module 210 may access the remote server 122 or a third-party service (e.g., Yelp™, Google Local) to perform a POI search in the target region. The POI information may include, for example, a name for the POI, a short description, images, hours of operation, contract information, ratings and reviews, and other information.

If a voice command was received with the gesture, then the input analysis module 208 also passes a character string representing the voice command to the POI search module 210 so that the character string can be used to narrow the results of the POI search. For example, the POI search module 210 would perform a search for the term "building" within the target region 408 after receiving the inputs shown in FIG. 4A.

Since the user typically performs the identifying gesture with the intention of retrieving information about a single POI, the input analysis module 208 may use an iterative process to adjust the target region until the POI search module 210 returns a single POI. For example, a triangular target region (e.g., the example target region 408 shown in FIG. 4B) can be adjusted by changing the length of the triangle in the direction of the direction vector 404 and/or changing the angle of the triangle at the corner corresponding to the vehicle 402. Thus, if the POI search finds multiple POIs, the input analysis module 208 may iteratively decrease the size of the target region until one POI is found. Similarly, if the search does not return any POIs, the input analysis module 208 may iteratively increase the size of the target region until a POI is returned. The single POI is then sent to the data output module 216 to be provided to the user. Alternatively, the input analysis module 208 may merely use the iterative process to reduce the number of POIs but still send multiple POIs to the data output module 208. This may be useful in cases where there is uncertainty over which POI the user was attempting to identify. For example, if there are two buildings in close proximity to each other in the example target region 408 of FIG. 4B, then the input analysis module 208 may send both POIs to the data output module 216.

If the input analysis module 208 determines that the target region overlaps with a micromapped region, then the input analysis module 208 sends the target region to the micromap management module 212 so that the micromap search module 211 can search the corresponding micromap to retrieve 314 POI information for the identified POI. The input analysis module 208 and the micromap search module 211 may operate in conjunction to perform an iterative process similar to the process described above with reference to the POI search module 210 to narrow the POI information that is sent to the data output module 216. Since the micromap is stored locally, the iterative process can be performed more quickly. In addition, the micromap search module 211 can advantageously perform a search in a locally stored micromap in situations where the communication links 105, 107 to the network 120 are unreliable or unavailable. Micromaps are also advantageous because they provide increased granularity in identifying and localizing POIs, and such POIs may reference various types of establishments. With localization, micromapping also enables more accurate reconstruction. In one embodiment, the range of reconstruction is limited to the range of micromapped objects. Hence, using a micromap may also change the range and overall number of accessible POIs. In one embodiment, the input analysis module 208 retrieves POI information from both search modules 210, 211 in parallel and merges the two sets of retrieved POI information into a single set of results. For example, the input analysis module 208 uses an artificial intelligence unit to merge the retrieved POI information.

After receiving the POI information from the input analysis module 208, the data output module 216 provides 316 the POI information to the user using the various output devices in the vehicle or the MCD 102. The data output module 216 may be configured to use one output device to output a portion of the POI information and use a different output device to output additional information. For example, the name of a POI may be spoken out to the user using the speaker 140 (shown in FIG. 4C) while the display 138 is used to show more detailed information about the POI, such as a description, photos, and contact information (shown in FIG. 4D).

Figure 4C:
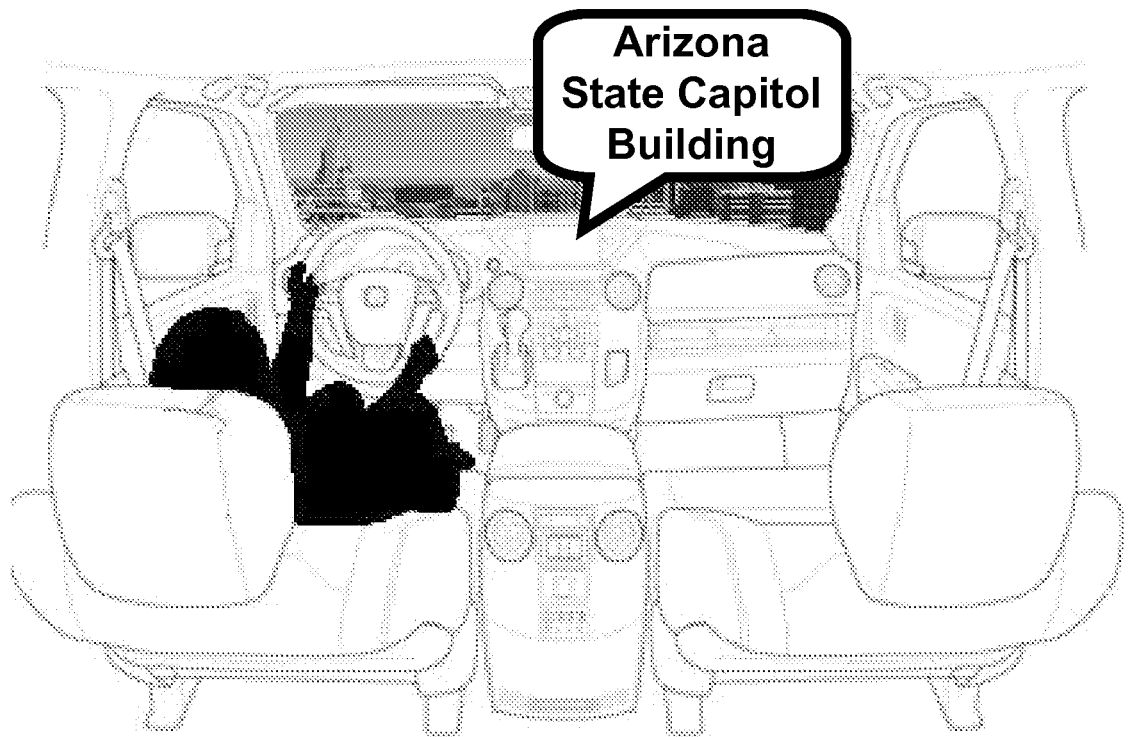
Figure 4D:
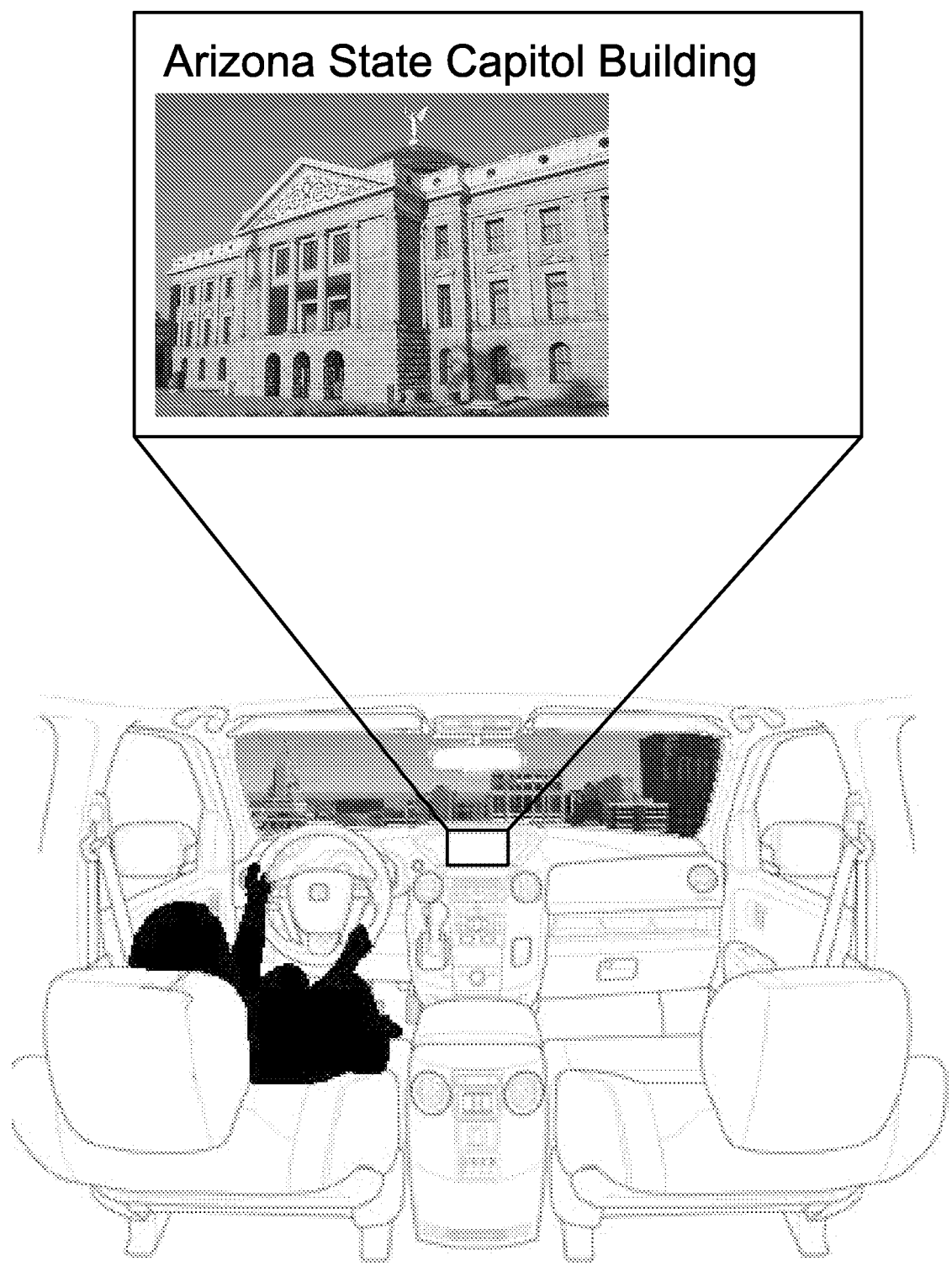

In the example shown in FIGS. 4C-4D, the data output module 216 is merely outputting information for a single POI. However, if the input analysis module 208 send information for multiple POIs to the data output module 216, the data output module 216 may first output a list of POIs (e.g., by showing a visual interface on the display 138 or by using the speaker 140 to speak out the names of the POIs). The user can then select a POI from the list (e.g., by performing a pointing gesture at the display 138 or speaking out a voice command) to view additional information for the POI.

In another embodiment, the gesture recognition module 202 determines 304 a three-dimensional direction vector instead of a two-dimensional vector, and the rest of the process 300 is expanded into three dimensions. Thus, location module 206 also determines 306 the vehicle's altitude, and the input analysis module 208 generates 308 a three-dimensional target region (e.g., a cone). Using a three-dimensional process 300 can beneficially provide more accurate POI information in locations where multiple POIs have the same lat/long coordinates but are located a different altitudes. For example, suppose the vehicle is driving through a city. If the user points toward the top of a skyscraper, the POI information retrieval module 136 would provide information about the skyscraper's observation deck instead of information about restaurants in the skyscraper's lobby.

Figure 5:
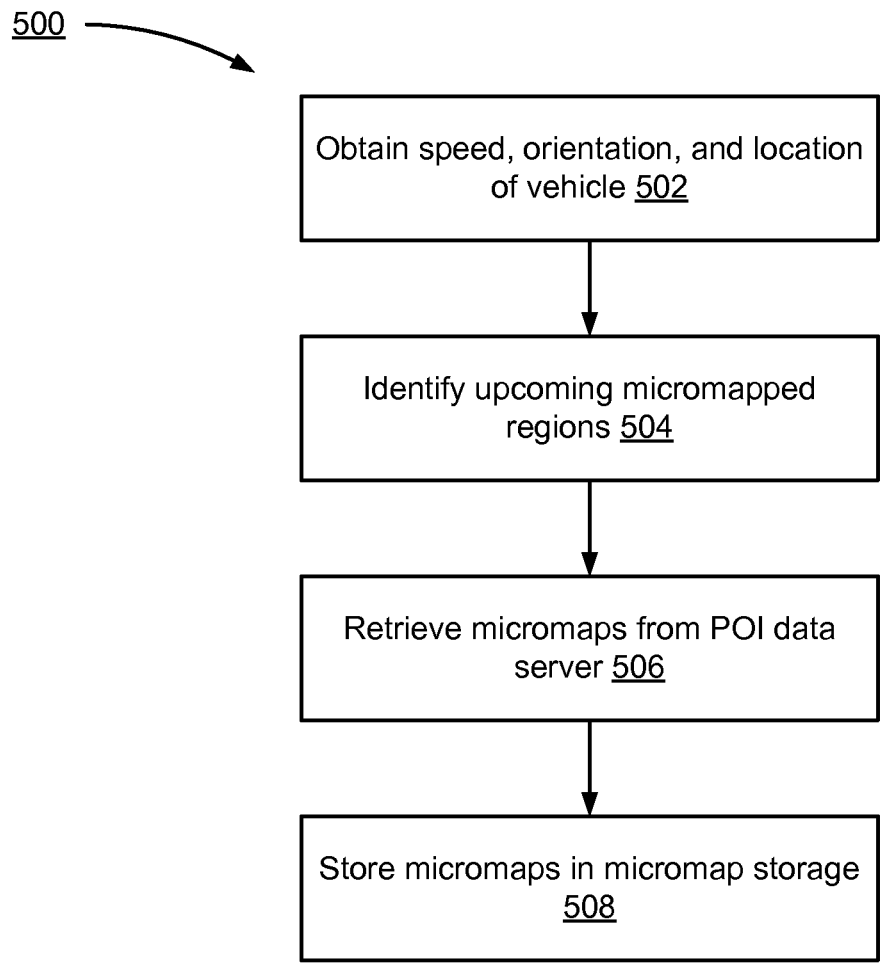
FIG. 5 is a flow chart illustrating a process for maintaining micromaps in the gesture-based POI search system, according to one embodiment.

FIG. 5 is a flow chart illustrating a process 500 for maintaining micromaps in the gesture-based POI search system, according to one embodiment. The micromap management module 212 begins by obtaining 502 the current speed, orientation, and location of the vehicle. The location and orientation of the vehicle may be obtained from the location module 206, as described above with reference to FIG. 2. In one embodiment, the micromap management module 212 obtains the vehicle's speed by accessing a component of the vehicle that directly measures its speed (e.g., a speedometer). Alternatively, the micromap management module 212 may determine the vehicle's speed by analyzing the location data of the vehicle over a known period of time.

Next, the micromap management module 212 analyzes the speed, orientation, and location data of the vehicle to identify 504 upcoming micromapped regions that the vehicle is likely to pass by or travel through. In one embodiment, the module 212 generates a retrieval region in front of the vehicle based on the vehicle's speed, orientation, and location, and any micromapped regions inside the retrieval region are identified as upcoming micromapped regions. The retrieval region may have a triangular shape similar to the target region described above with reference to FIGS. 3 and 4B. Alternatively, the retrieval region may have some other shape (e.g., a corridor centered on the road that the vehicle is currently traveling on, an ellipse that extends in front of the vehicle, etc).

After identifying 504 one or more upcoming micromapped regions, the micromap management module retrieves 506 the corresponding micromaps from the remote server 122. As described above with reference to the micromap management module 212, a micromap is a map of a region that contains one or more POIs and contains information related to the POIs in the micromapped region. The POI information in a micromap may include, for example, a name for the POI, a short description, images, hours of operation, contract information, ratings and reviews, performance schedules, and other information. The retrieved micromaps 506 are stored 508 in the micromap storage 214 so that they can be rapidly accessed when the user performs an identifying gesture for a POI in one of the stored micromaps.

In addition to automatically adding micromaps according to the process 500 described above, the micromap management module 212 may also be configured to delete micromaps from the micromap storage 214. In one embodiment, the module 212 deletes micromaps based on a similar analysis of the vehicle's speed, orientation, and location. For example, the micromap management module 212 may automatically delete a micromap if the vehicle is moving away from the corresponding region. In another embodiment, the module 212 may delete a micromap if the micromap has not been accessed for a certain period of time.

Additional Considerations

Although the description herein is presented with reference to an in-vehicle communications system 112, the systems and processes described in this specification may also be implemented in mobile devices such as smartphones and tablet computers independently of a vehicle. For example, a magnetometer and location module integrated into a mobile device can be used to determine the location, speed, and orientation of a mobile device, while a camera in the mobile device can be used to capture the identifying gesture.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which are set forth in the claims.

Upon reading this disclosure, those of skill in the art will appreciate still additional alternative methods and systems for performing a gesture-based POI search. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A vehicle-based computer-implemented method for retrieving information associated with a point of interest, the method comprising:
   accessing, at a computer system, electronic movement data representing a current speed of a vehicle and electronic location data representing a current location and an orientation of the vehicle based on an electronic reception of electronic sensor data;
   analyzing the electronic movement data and the electronic location data to determine a region that the vehicle is likely to travel through;
   receiving an electronic data signal representing a gesture performed by a user inside the vehicle;
   performing gesture recognition on the electronic data signal to determine a direction vector representing a direction the gesture indicates, wherein the direction vector is a multi-dimensional vector that represents a direction of the gesture performed by the user relative to a pair of axes that are parallel to a direction of travel of the vehicle and perpendicular to the direction of travel of the vehicle;
   receiving a voice command issued by the user inside the vehicle;
   performing electronic voice recognition on the voice command to electronically determine one or more words spoken by the user as part of the voice command;
   analyzing, at the computer system, the direction vector, the electronic movement data, the electronic location data, the region that the vehicle is likely to travel through and the words spoken by the user to identify a point of interest (POI) that is of interest to the user that aligns with the direction vector, wherein a point of interest search is performed by electronically accessing and electronically querying an electronic datastore to determine information associated with the POI; and
   executing electronic instructions to electronically control a display device to provide the information associated with the POI.

2. The computer-implemented method of claim 1, further including generating a target region corresponding to the direction vector, the electronic movement data, and the electronic location data;
   wherein identifying the POI includes determining that the POI is inside the target region, wherein the target region aligns with the direction vector and is dependent on the current speed of the vehicle.

3. The computer-implemented method of claim 2, wherein a size of the target region increases as a speed of the vehicle increases.

4. The computer-implemented method of claim 2, wherein:
   depth information within the data signal is utilized to generate a three-dimensional depth reconstruction of the gesture that pertains to the target region, wherein the location data includes an altitude of the vehicle, and the target region is three-dimensional based on the three-dimensional depth reconstruction of the gesture.

5. The computer-implemented method of claim 2, further including:
   accessing from a local storage, information associated with one or more points of interest that are located in the region that the vehicle is likely to travel through, wherein the one or more points of interest include the POI; and
   determining locations of the one or more points of interest relative to the target region;
   wherein the POI is identified from among the one or more points of interest by determining that the POI is inside the target region.

6. The computer-implemented method of claim 5, wherein if the information associated with the POI is not in the local storage, then the method further includes:
   querying a remote server with the target region to identify the POI, and
   accessing the information associated with the POI from the remote server.

7. The computer-implemented method of claim 6, wherein if two or more points of interest, including the POI, are inside the target region and are identified as being of interest to the user, then the method further includes using the one or more words spoken by the user to identify the POI from among the two or more points of interest.

8. The computer-implemented method of claim 6, wherein if two or more points of interest, including the POI, are inside the target region and are identified as being of interest to the user, then the method further includes iteratively decreasing a size of the target region until only the POI is inside the target region.

9. The computer-implemented method of claim 6, wherein:
   if two or more points of interest, including the POI, are inside the target region and are identified as being of interest to the user, then the two or more points of interest, including the POI, is provided to the user in a list; and
   the information associated with the POI is provided to the user upon the POI being selected from the list by the user.

10. The computer-implemented method of claim 6, wherein if zero points of interest are inside the target region, then the method further includes iteratively increasing a size of the target region until only the POI is inside the target region.

11. A non-transitory computer-readable storage medium for storing computer program instructions for retrieving information associated with a point of interest (POI), the program instructions when executed by a processor cause the processor to perform steps including:

accessing electronic movement data representing a current speed of a vehicle and electronic location data representing a current location and an orientation of the vehicle based on an electronic reception of electronic sensor data;

analyzing the electronic movement data and the electronic location data to determine a region that the vehicle is likely to travel through;

receiving an electronic data signal representing a gesture performed by a user inside the vehicle;

performing gesture recognition on the electronic data signal to determine a direction vector representing a direction the gesture indicates, wherein the direction vector is a multi-dimensional vector that represents a direction of the gesture performed by the user relative to a pair of axes that are parallel to a direction of travel of the vehicle and perpendicular to the direction of travel of the vehicle;

receiving a voice command issued by the user inside the vehicle;

performing electronic voice recognition on the voice command to electronically determine one or more words spoken by the user as part of the voice command;

analyzing, at the computer system, the direction vector, the electronic movement data, the electronic location data, the region that the vehicle is likely to travel through and the words spoken by the user to identify a POI that is of interest to the user that aligns with the direction vector, wherein a point of interest search is performed by electronically accessing and electronically querying an electronic datastore to determine information associated with the POI; and executing electronic instructions to electronically control a display device to provide the information associated with the POI.

12. The non-transitory computer readable storage medium of claim 11, wherein the program instructions further cause the processor to perform steps including generating a target region corresponding to the direction vector, the electronic movement data, and the electronic location data;

wherein identifying the POI includes determining that the POI is inside the target region, wherein the target region aligns with the direction vector and is dependent on the current speed of the vehicle.

13. The non-transitory computer readable storage medium of claim 12, wherein a size of the target region increases as a speed of the vehicle increases.

14. The non-transitory computer readable storage medium of claim 12, wherein:

depth information within the data signal is utilized to generate a three-dimensional depth reconstruction of the gesture that pertains to the target region, wherein the location data includes an altitude of the vehicle, and the target region is three-dimensional based on the three-dimensional depth reconstruction of the gesture.

15. The non-transitory computer readable storage medium of claim 12, wherein the program instructions further cause the processor to perform steps including:

accessing from a local storage, information associated with one or more points of interest that are located in the region that the vehicle is likely to travel through, wherein the one or more points of interest include the POI; and determining locations of the one or more points of interest relative to the target region;

wherein the POI is identified from among the one or more points of interest by determining that the POI is inside the target region.

16. The non-transitory computer readable storage medium of claim 15, wherein if the information associated with the POI is not in the local storage, then the program instructions further cause the processor to perform steps including:

querying a remote server with the target region to identify the POI, and accessing the information associated with the POI from the remote server.

17. The non-transitory computer readable storage medium of claim 16, wherein if two or more points of interest, including the POI, are inside the target region and are identified as being of interest to the user, then the program instructions further cause the processor to perform steps including using the one or more words spoken by the user to identify the POI from among the two or more points of interest.

18. The non-transitory computer readable storage medium of claim 16, wherein if two or more points of interest, including the POI, are inside the target region and are identified as being of interest to the user, then the program instructions further cause the processor to perform steps including iteratively decreasing a size of the target region until only the POI is inside the target region.

19. The non-transitory computer readable storage medium of claim 16, wherein:

if two or more points of interest, including the POI, are inside the target region and are identified as being of interest to the user, then the two or more points of interest, including the POI, is provided to the user in a list; and the information associated with the POI is provided to the user upon the POI being selected from the list by the user.

20. The non-transitory computer readable storage medium of claim 16, wherein if zero points of interest are inside the target region, then the program instructions further cause the processor to perform steps including iteratively increasing a size of the target region until only the POI is inside the target region.

* * * * *